Figure 1:
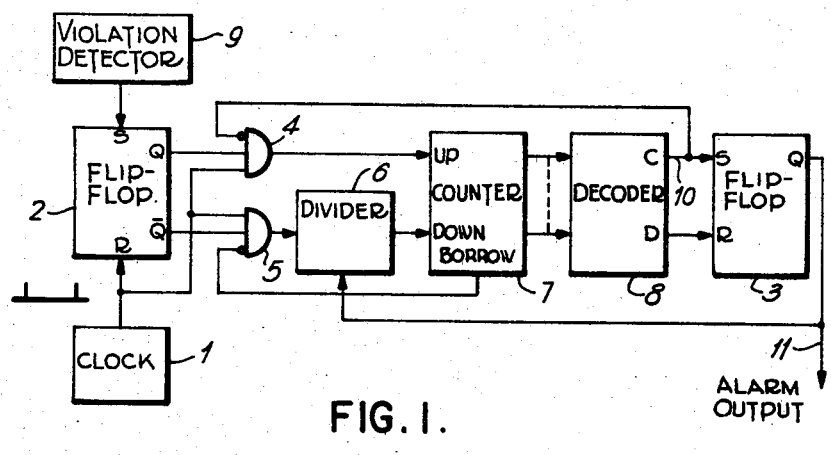

United States Patent [19]
Grover

[11] 4,363,123
[45] Dec. 7, 1982

[54] METHOD OF AND APPARATUS FOR MONITORING DIGITAL TRANSMISSION SYSTEMS IN WHICH LINE TRANSMISSION ERRORS ARE DETECTED

[75] Inventor: Wayne D. Grover, Ottawa, Canada

[73] Assignee: Northern Telecom Limited, Montreal, Canada

[21] Appl. No.: 211,507

[22] Filed: Dec. 1, 1980

[51] Int. Cl.³ .......................................... G01R 31/28
[52] U.S. Cl. .................................. 371/5; 235/92 EC; 371/22
[58] Field of Search .................. 371/5, 22; 235/92 EC

[56] References Cited

U.S. PATENT DOCUMENTS

| | | | |
|---|---|---|---|
| 4,053,751 | 10/1977 | Ault | 371/5 |
| 4,080,589 | 3/1978 | Kline | 371/5 |
| 4,234,953 | 11/1980 | Kline | 371/5 |
| 4,241,445 | 12/1980 | Payen | 371/5 |
| 4,291,403 | 9/1981 | Waddill et al. | 371/5 |

*Primary Examiner*—Charles E. Atkinson
*Attorney, Agent, or Firm*—R. John Haley

[57] ABSTRACT

A periodically reset flip-flop is set when an error is detected in the bit stream of a digital transmission link being monitored. A counter is incremented in response to each period during which the flip-flop is set and is decremented in response to a plurality of periods during each of which the flip-flop is not set. An alarm signal is produced if the count reaches a certain value. In the presence of the alarm signal, the number of error-free periods which must occur to decrement the counter is increased. The arrangement is less sensitive to error bursts causing false alarms than bit-error-rate monitoring arrangements.

12 Claims, 2 Drawing Figures

METHOD OF AND APPARATUS FOR MONITORING DIGITAL TRANSMISSION SYSTEMS IN WHICH LINE TRANSMISSION ERRORS ARE DETECTED

This invention relates to a method of and apparatus for monitoring digital transmission systems in which line transmission errors are detected.

It is known to monitor the performance of digital transmission systems, such as PCM telephone and voice-band data signal transmission systems, by measuring the bit error rate (or code violation rate when the bits are encoded for transmission), and to use this measurement as a criterion for triggering alarms and protection switch operations. However, because transmission systems are subject to impulse noise which gives rise to error bursts, with consequent high bit error rates for short periods, bit error rate performance monitoring can produce intermittent alarms when no faults exist in the transmission systems, resulting in unnecessary protection switch operations and maintenance activity. Furthermore, the use of bit error rate measurement for monitoring the performance of a transmission system over a period of time when personnel are not present produces a large amount of data to be processed. Accordingly, bit error rate performance monitoring suffers from various disadvantages. Whilst various steps can be taken to reduce some of these disadvantages, they involve increasing circuit complexity and costs which are also disadvantageous.

Accordingly, an object of this invention is to provide an improved method of and apparatus for monitoring a digital transmission system in which errors are detected.

According to one aspect, this invention provides a method of monitoring a digital transmission system in which errors are detected, comprising: defining periods during each of which a plurality of errors may occur; determining whether or not at least one error occurs in each of said periods; in respect of each period, incrementing a digital value in a direction which is dependent upon the result of the determination; and producing an output signal in response to the digital value having a perdetermined level.

Thus instead of responding to individual bit errors or code violations, in accordance with the invention a determination is made as to whether or not any errors occur in a period which may extend over a very large number of bits. Thus an error burst, comprising a high number of bit errors in a short time, will generally occur within one or two periods, giving only one or two determinations of error periods. Whilst these determinations will result in incrementing of the digital value, the digital value is not sufficiently changed to result in production of the output (alarm) signal, and the digital value is changed back to its initial value in response to subsequent error-free periods. Conversely, with a digital transmission system which is subject to continuing errors due to a fault, periods each containing at least one error will occur frequently resulting in cumulative incrementing of the digital value and production of the output signal.

Preferably the output signal, when produced, is continuously produced until the digital value has a second predetermined value. Preferably also the amount of each increment of the digital value in respect of a period during which no error has occurred is less when the output signal is being produced than when the output signal is not being produced. This provides a desirable hysteresis between the production and termination of the output signal.

The digital value can be incremented by different amounts in the different directions, so that for example each period during which at least one error occurs results in a greater change of the digital value than each period during which no error occurs.

The digital value is conveniently the count of a counter, but it could alternatively be some other digital quantity, for example the cumulative sum of an arithmetic logic unit.

The invention also extends to apparatus for monitoring a digital transmission system in which errors are detected, comprising: timing means for defining periods during each of which a plurality of errors may occur; bistable means arranged to be set from a first state to a second state in response to detection of an error during a period defined by the timing means; means responsive to the end of each period for incrementing a digital value in a first or second, opposite, direction in dependence upon the state of the bistable means at the end of the period; and means for producing an output signal in response to the digital value reaching a predetermined level.

Conveniently the timing means comprises a clock pulse generator which produces pulses which define said periods, and the bistable means is arranged to be set from the second state to the first state in response to each of said pulses, the apparatus including gating means for gating at least one output of the bistable means with said pulses for controlling said means for incrementing the digital value.

Preferably the gating means is arranged to inhibit incrementing of the digital value beyond predetermined limits, such as the minimum and maximum counts of an up-down counter which constitutes the means for incrementing the digital value.

Figure 2:
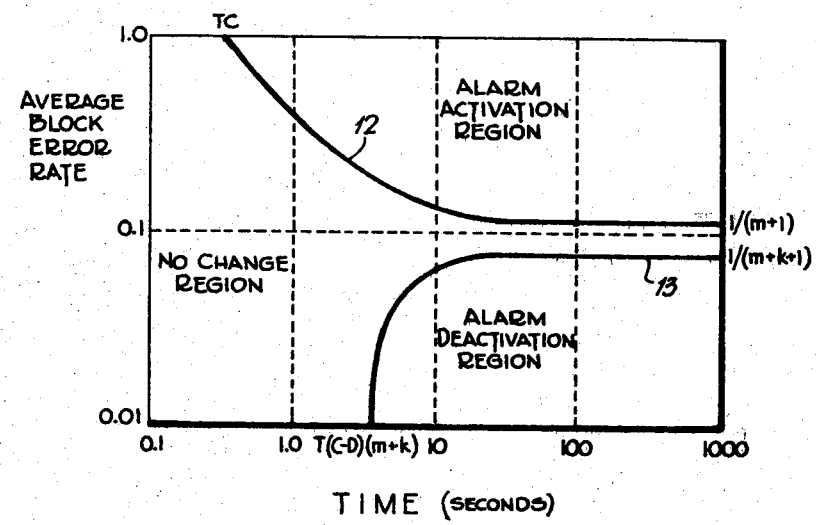

The invention will be further understood from the following description with reference to the accompanying drawings, in which:

FIG. 1 illustrates apparatus in accordance with a preferred embodiment of the invention; and FIG. 2 illustrates operational characteristics of the apparatus.

The apparatus shown in FIG. 1 comprises a clock pulse generator 1, set-reset flip-flop 2 and 3, AND gates 4 and 5 each of which has two inputs and a third, inhibiting, input, a frequency divider 6, an up-down counter 7, and a decoder 8. FIG. 1 also shows a violation detector 9 which does not form part of the apparatus of the invention but whose output, which becomes a logic 1 in response to each code violation or error, is supplied as an input to the apparatus of this invention. Violation or error detectors are known in the art and accordingly a detailed description of the detector 9 is not necessary here. However, it is observed that in this embodiment the detector 9 is a code violation detector which detects code violations in a 2AMI (two-level alternate mark inversion) bit stream at a bit rate of 12.624 Mb/s, the bit stream comprising 96 voice channels and having been transmitted via an optical fiber digital transmission link.

The flip-flop 2 is set via its input S in response to each code violation detected by the detector 9, and is reset via its input R in response to short-duration pulses which are supplied by the clock pulse generator 1. The frequency of the pulses supplied by the generator 1 is selected to be 96 Hz, corresponding to the 96 voice channels, so that the flip-flop 2 is reset every period $T=1/96$ seconds. The generator 1 can comprise an astable multivibrator, as its frequency is not critical.

Thus at the end of each period T, the flip-flop 2 is in its set state if at least one violation has been detected by the detector 9 during the period; otherwise it is in its reset state. If one or more code violations have been detected during a period T, and if the counter 7 does not have a count C so that the gate 4 is not inhibited, then at the end of the period with the pulse supplied by the generator 1 the gate 4 supplies a logic 1 to an up count input of the counter 7 to cause its count to increase by one. Conversely, if no violation is detected during a period T, and if the counter 7 does not have a zero count so that its borrow output has a logic 0 and the gate 5 is not inhibited, then at the end of the period with the pulse supplied by the generator 1 the gate 5 supplies a logic 1 to an input of the frequency divider 6. The frequency divider 6, which can comprise a counter which may form part of the counter 7, initially has a division factor m, and has an output connected to a down count input of the counter 7, so that for every m error-free periods T which occur the count of the counter is decreased by one.

The count of the counter 7 is decoded by the decoder 8. If the count reaches a first value C then the decoder supplies a logic 1 to a line 10 to inhibit the gate 4, and therefore to prevent further upward counting by the counter, and to set the flip-flop 3 via its input S. The flip-flop 3 consequently provides an alarm output signal on a line 11. This signal on the line 11 is also supplied to a control input of the frequency divider 6 to cause its division factor to be increased from m to m+k. Consequently, in the presence of the alarm output signal, m+k error-free periods T are required in order to decrease the count of the counter 7 by one. If a sufficient number of error-free periods occurs, then the count of the counter 7 is reduced to a value D, this being decoded by the decoder 8 to reset the flip-flop 3 via its input R, thereby terminating the alarm output signal and changing the division factor of the frequency divider 6 back to m.

The operational characteristics of the apparatus of FIG. 1 are illustrated in FIG. 2. In FIG. 2 a curve 12 illustrates the triggering characteristics of the apparatus, i.e. how long an error event having a certain average block error rate must persist in order for the flip-flop 3 to be set to cause the alarm output signal to be produced, and a curve 13 similarly illustrates the alarm signal terminating characteristics of the apparatus. In the area between the curves 12 and 13 no change of the state of the flip-flop 3 occurs. The counter 7 is assumed to have an initial count of zero in the former case and C in the latter case. The average block error rate is the ratio of the number of periods T each having one or more errors to the total number of periods T. The curves 12 and 13 in FIG. 2 are shown for the values $T=1/96$ seconds, $C=32$, $D=4$, $m=8$, and $k=4$, by way of example.

As can be seen from FIG. 2, if each period T contains at least one error, so that the average block error rate is 1.0, then the counter 7 will reach the count C to produce the alarm output signal after a time TC. At lower block error rates progressively longer times are taken for the counter to reach the count C, the curve 12 becoming asymptotic to $1/(m+1)$. Thus for a block error rate less than $1/(m+1)$, the alarm output signal will not be produced. The curve 12 illustrates that the apparatus provides the alarm output signal progressively more quickly for more severe block error rates, but produces no alarm output signal for error events of less than a certain duration, regardless of their severity. These characteristics are desirable for controlling an automatic protection switching system using the alarm output signal.

If the alarm output signal has been produced then, as a result of the changing of the division factor of the divider 6 as already described, a lower block error rate of less than $1/(m+k+1)$, to which value the curve 13 is asymptotic, is needed in order to terminate the alarm output signal. Thus modifying the division factor by k has the effect of providing the hysteresis between alarm activation and deactivation shown in FIG. 2. At lower block error rates, the curve 13 is asymptotic to the time $T(C-D)(m+k)$, which is the minimum time required to terminate the alarm output signal when all of the periods T are error-free.

It should be appreciated that many modifications, adaptations, and variations may be made to the decribed apparatus without departing from the scope of the invention as defined in the claims. For example, the decoder 8 may be simplified or dispensed with if the value C corresponds to the maximum count of the counter 7, the flip-flop 3 being set and the gate 4 being inhibited by a carry output of the counter. Similarly, the value D may be selected to be zero, in which case the flip-flop 3 can be reset by the borrow output of the counter 7. If the described hysteresis is not desired, then k may be made zero. Instead of the divider 6 being a separate unit, this may be incorporated as part of the counter 7 as already indicated. Alternatively, the divider 6 and counter 7 can be replaced by an arithmetic logic unit arranged to increase and decrease a cumulative sum. Furthermore, while the clock pulse generator frequency is selected as described above so that the flip-flop 2 is reset every 1/96 seconds for the 96 channels, whereby the alarm characteristic is equivalent to erro-second monitoring for each voice channel even though the alarm response is much faster, a different or arbitrary frequency can be selected. Outputs of the counter 7 and/or the decoder 8 can be used for performance monitoring of a transmission system without producing excessive amounts of data. Finally, it is noted that the apparatus is particularly suitable for implementation in a single integrated circuit device.

What is claimed is:

1. A method of monitoring a digital transmission system in which errors are detected, comprising:
    defining periods during each of which a plurality of errors may occur;
    determining whether or not at least one error occurs in each of said periods;
    in respect of each period, incrementing a digital value in a direction which is dependent upon the result of the determination; and
    producing an output signal in response to the digital value having a predetermined level.

2. A method as claimed in claim 1 wherein the output signal, when produced, is continuously produced until the digital value has a second predetermined value.

3. A method as claimed in claim 2 wherein the amount of each increment of the digital value in respect of a period during which no error has occurred is less when the output signal is being produced than when the output signal is not being produced.

4. A method as claimed in claim 1, 2, or 3 wherein the digital value is incremented by different amounts in the different directions.

5. A method as claimed in claim 1, 2, or 3 wherein the digital value comprises the count of a counter.

6. Apparatus for monitoring a digital transmission system in which errors are detected, comprising:

timing means for defining periods during each of which a plurality of errors may occur;

bistable means arranged to be set from a first state to a second state in response to detection of an error during a period defined by the timing means;

means responsive to the end of each period for incrementing a digital value in a first or second, opposite, direction in dependence upon the state of the bistable means at the end of the period; and means for producing an output signal in response to the digital value reaching a predetermined level.

7. Apparatus as claimed in claim 6 wherein the timing means comprises a clock pulse generator which produces pulses which define said periods, and the bistable means is arranged to be set from the second state to the first state in response to each of said pulses, the apparatus including gating means for gating at least one output of the bistable means with said pulses for controlling said means for incrementing the digital value.

8. Apparatus as claimed in claim 7 wherein said gating means is arranged to inhibit incrementing of the digital value beyond predetermined limits.

9. Apparatus as claimed in claim 8 wherein said means for incrementing the digital value comprises an up-down counter whose count constitutes the digital value, the gating means being coupled to the counter for controlling the counting direction thereof.

10. Apparatus as claimed in claim 9 and including a frequency changer for causing the count of the counter to change more for periods during which the bistable means is set to the second state than for periods during which the bistable means is not set to the second state.

11. Apparatus as claimed in claim 10 wherein the means for producing the output signal comprises a bistable device which is arranged to be set from a first state to a second state in which the output signal is produced in response to the digital value reaching the predetermined level, and to be set from the second state to the first state in which the output signal is not produced in response to the digital value reaching another predetermined level.

12. Apparatus as claimed in claim 11 wherein the frequency changer is responsive to the state of said bistable device to cause the count of the counter to change less in respect of periods during which no errors are produced and the bistable device has its second state than in respect of periods during which no errors are produced and the bistable device has its first state.

* * * * *